US012611346B2

(12) United States Patent
Muñoz Cabello et al.

(10) Patent No.: US 12,611,346 B2
(45) Date of Patent: Apr. 28, 2026

(54) ANTI-BEDSORE DEVICE

(71) Applicants: SERVICIO ANDALUZ DE SALUD, Seville (ES); UNIVERSIDAD DE CÓRDOBA, Cordova (ES)

(72) Inventors: Laura Muñoz Cabello, Seville (ES); Fernando Jesús Mayordomo Riera, Cordova (ES); David Requena Polonio, Seville (ES)

(73) Assignees: SERVICIO ANDALUZ DE SALUD, Seville (ES); UNIVERSIDAD DE CÓRDOBA, Cordova (ES)

( * ) Notice: Subject to any disclaimer, the term of this patent is extended or adjusted under 35 U.S.C. 154(b) by 32 days.

(21) Appl. No.: 18/696,323

(22) PCT Filed: Sep. 29, 2022

(86) PCT No.: PCT/ES2022/070618
§ 371 (c)(1),
(2) Date: Mar. 27, 2024

(87) PCT Pub. No.: WO2023/052669
PCT Pub. Date: Apr. 6, 2023

(65) Prior Publication Data

US 2024/0398642 A1 Dec. 5, 2024

(30) Foreign Application Priority Data

Sep. 29, 2021 (ES) ................................ 202131930U

(51) Int. Cl.
*A61G 7/057* (2006.01)
*A61G 7/075* (2006.01)

(52) U.S. Cl.
CPC .......... *A61G 7/057* (2013.01); *A61G 7/0755* (2013.01)

(58) Field of Classification Search
CPC .... A61G 7/057; A61G 7/0755; A61G 13/125; A61G 13/12; A61G 7/05723;
(Continued)

(56) References Cited

U.S. PATENT DOCUMENTS

| | | |
|---|---|---|
| 4,186,738 A | 2/1980 | Schleicher et al. |
| 4,951,334 A | 8/1990 | Maier |

(Continued)

FOREIGN PATENT DOCUMENTS

| | | |
|---|---|---|
| CN | 204274861 U | 4/2015 |
| CN | 209450837 U | 10/2019 |

(Continued)

OTHER PUBLICATIONS

Es hoy, es hoy, "Unboxing Cojín Egg Sitter, " YouTube Video, Oct. 7, 2020, URL=https://www.youtube.com/watch?v=jrVCcFyoQOY, download date Nov. 21, 2025. (1 page) (Screenshot).

*Primary Examiner* — Madison Emanski
(74) *Attorney, Agent, or Firm* — Seed Intellectual Property Law Group LLP

(57) ABSTRACT

The present invention relates to an anti-bedsore device, characterised in that it comprises: an internal surface, an external surface, and a plurality of ribs made from an elastic material, attached to the internal surface and to the external surface, and located within the space defined between both surfaces, and oriented radially with respect to a central point, such that the space defined between the two surfaces forms a first cushioning chamber for cushioning a weight that is resting upon one of the surfaces.

12 Claims, 3 Drawing Sheets

(58) Field of Classification Search

CPC ............ A61G 13/0063; A61G 13/0081; A61G 2200/56; A61G 5/1043; A61G 5/1045; A61G 5/1091; A61G 7/05707; A61G 7/05715; A61G 7/065; A61G 7/075; A47C 20/021; A47C 20/027; A47C 16/02; A47C 20/00; A47C 27/146; A61F 5/0585; A61F 13/069; A61F 5/01; A61F 5/0195; A61F 5/00; A61F 5/0111; A61F 15/005; A61F 5/012; A61F 5/0127; A61F 5/05841; A61F 5/3723; A61F 5/3761; A61H 1/00; A43B 1/0045; A43B 7/1455; A43B 7/20; A43B 7/24

USPC ... 5/650, 648, 651, 630, 646, 652, 653, 724, 5/731, 953; 128/882, 878, 879, 845, 869, 128/876, 892, 893, 894, DIG. 15; 601/27; 602/23, 15, 27, 28, 65, 16, 5

See application file for complete search history.

(56) References Cited

U.S. PATENT DOCUMENTS

| | | | | |
|---|---|---|---|---|
| 5,007,124 A | | 4/1991 | Raburn et al. | |
| 5,046,487 A | * | 9/1991 | Scott | A63B 23/085 128/DIG. 15 |
| 5,569,174 A | | 10/1996 | Varn | |
| 5,957,874 A | * | 9/1999 | Klein | A61F 5/0195 128/882 |
| 6,435,187 B1 | * | 8/2002 | Leithe | A61F 13/069 128/869 |
| 7,118,544 B2 | * | 10/2006 | Murray | A47C 20/021 602/23 |
| 2001/0016960 A1 | | 8/2001 | Grabell et al. | |
| 2009/0044815 A1 | * | 2/2009 | Bruckner | A61G 7/057 128/893 |

FOREIGN PATENT DOCUMENTS

| | | | |
|---|---|---|---|
| CN | 210644418 | U | 6/2020 |
| CN | 210843935 | U | 6/2020 |
| GB | 2552359 | A | 1/2018 |
| WO | 2014154499 | A1 | 10/2014 |

* cited by examiner

ANTI-BEDSORE DEVICE

OBJECT OF THE INVENTION

The present invention relates to an anti-bedsore device to prevent injuries to the skin and underlying tissue in people with reduced mobility due to pressure, friction, or abrasion, the shape of which can be adapted to any part of a patient's body such as, for example: head, shoulder blades, hip, lower back or coccyx, heels, ankles, fibula, etc.

One of the objects of the invention is to provide a simple, breathable, and easy-to-manufacture anti-bedsore device that does not require closure means for fixing it to a patient's body.

BACKGROUND OF THE INVENTION

Bedsores are injuries that occur to the skin and underlying tissue due to pressure, friction, or abrasion, particularly affecting bony areas such as the sacrum, hips, heels, and ankles. People most at risk of bedsores have medical conditions that limit their ability to change position or cause them to spend most of their time in a bed or chair.

Bedsores can develop over the course of hours or days. For people who need to remain in bed, bedsores may appear in the following areas:

the back or sides of the head;
the shoulder blades;
the hip, lower back or coccyx;
the heels, ankles, and area corresponding to the head of the fibula.

DESCRIPTION OF THE INVENTION

The anti-bedsore device object of the invention comprises: an internal surface, an external surface, and a plurality of ribs made from an elastic material, for example an elastomer, which are located within the space defined between both surfaces, and attached to the internal surface and to the external surface. Furthermore, the ribs are oriented radially with respect to a central point, such that the space defined between the two surfaces forms a first cushioning chamber for cushioning a weight that is resting upon one of the surfaces. Specifically, the ribs are oriented in a manner diverging from the internal surface towards the external surface.

In a preferred embodiment of the invention, the internal and external surfaces are curved surfaces.

In another preferred embodiment of the invention, the internal and external surfaces are curved surfaces and connected at their ends forming a tubular body the section of which is in a horseshoe shape. A space suitable for receiving part of a patient's leg supported on the internal surface is defined between the side lobes of the tubular body and the internal surface.

Conventional anti-bedsore suspension systems have a series of closure elements such as Velcro closure elements and a fastening that partially surrounds a part of the patient's body, so they are not very breathable. However, the device of the present invention does not require a Velcro fastening system given that, when it supports a pressure, the device deforms and obstructs the foot from coming out of the upper portion, with the side lobes of the tubular body closing inwardly, such that the inclusion of alternative fastening elements is not required.

Preferably, the device further comprises an intermediate surface located between the internal and external surfaces, such that a second cushioning chamber is defined between the intermediate surface and the internal surface. In this case, the device has ribs made from an elastic material located in said second cushioning chamber attached to the intermediate surface and the internal surface, likewise with a radial orientation.

Due to their elastic property, the ribs buckle and contract to take on or cushion the stresses produced between the external area and by the weight of the patient's limb.

The ribs are walls with a winding profile which preferably extend transversely to the internal and external surfaces.

There is a higher density of ribs per unit volume in the first cushioning chamber than in the second cushioning chamber, such that the degree of deformation of the second cushioning chamber is greater than that of the first chamber.

Preferably, the internal, intermediate, and upper surfaces, which define the two cushioning chambers, and the ribs, are manufactured from an elastomer material, providing a degree of elasticity suitable to favour patient comfort and reduce the pressure and discomfort the patient may experience as much as possible.

In an embodiment of the invention, the device further comprises a pedal-like accessory which can be coupled between the ribs and configured such that when the ankle area of a patient is resting upon the internal surface, the sole of the foot rests upon the pedal-like accessory. The functionality of the accessory is to prevent club foot, where necessary.

The accessory has a neck, a pedal per se assembled at the upper end of the neck, and two bars emerging from the lower portion of the neck and insertable between the ribs of the device.

These bars form an adjustable system which allows fastening at different lengths of separation in order to adapt to required size in each patient. The purpose is to maintain an optimal 90-degree angle between the food and the leg.

The accessory is sized such that when it is coupled to the rest of the device, the lower portion of the accessory is at a higher level than the lower area of the external surface. Said level is compensated for when the deformable body is compressed due to the force exerted by the weight of the patient.

DESCRIPTION OF THE FIGURES

Preferred embodiments of the invention are described below in reference to the figures of the application in which the following is shown.

PREFERRED EMBODIMENT OF THE INVENTION

Figure 1:
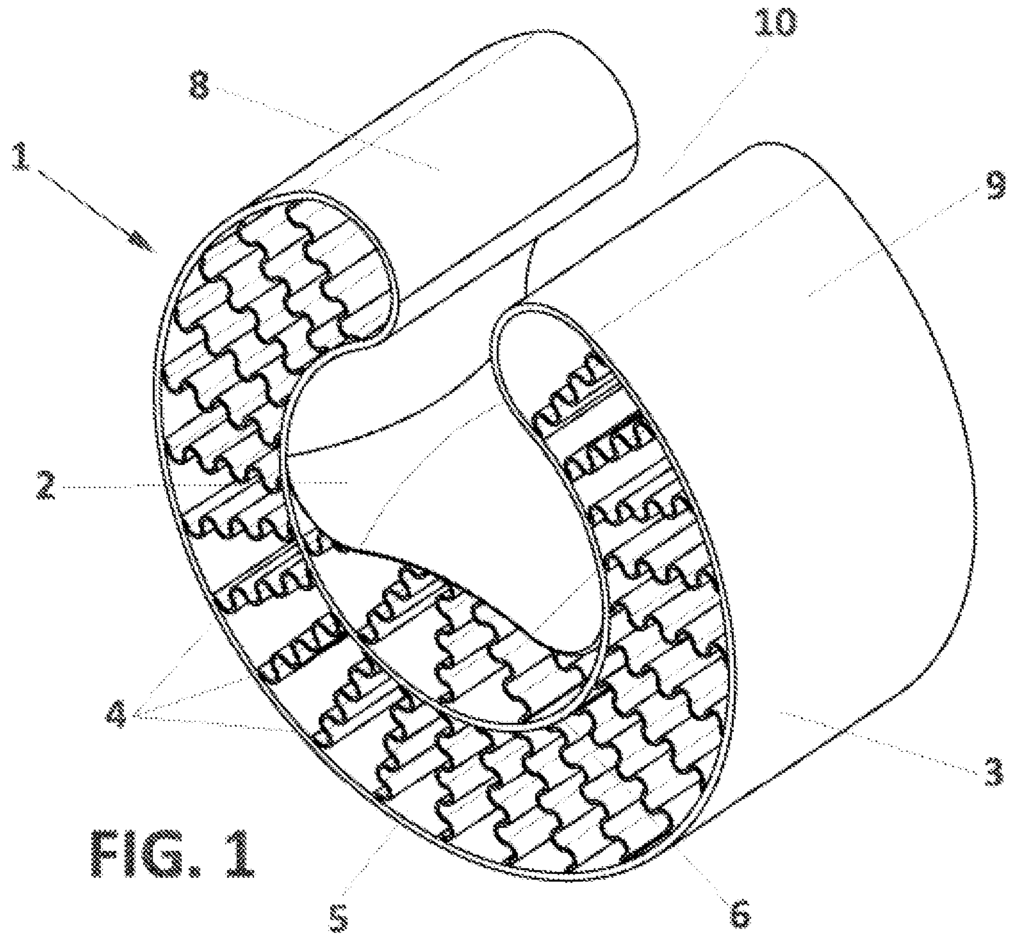
FIG. 1 shows a perspective view of a preferred embodiment of the invention.
Figure 2:
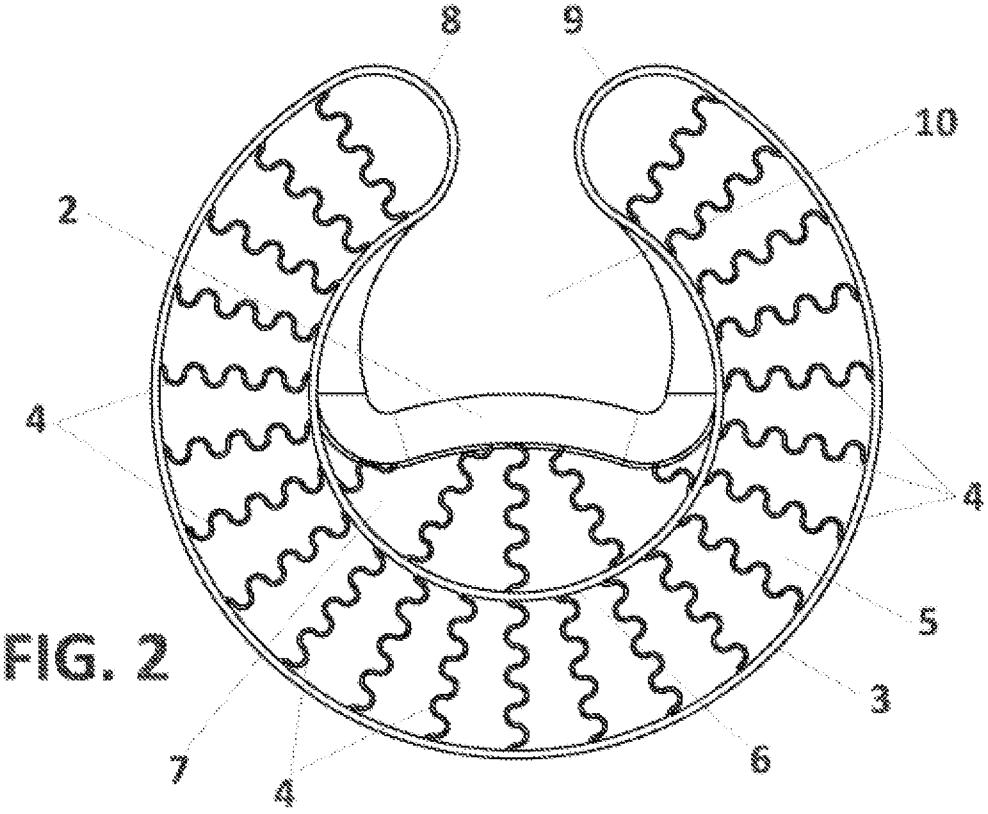
FIG. 2 shows a front elevational view of the embodiment of FIG. 1.

In view of FIGS. 1 and 2, it can be seen how the anti-bedsore device (1) comprises: an internal surface (2), an external surface (3), and a plurality of ribs (4) made from an elastomer material, attached to the internal surface and to the external surface (2, 3). The ribs (4) are located within the space defined between both surfaces (2, 3) and are oriented radially and in a manner diverging from the internal surface towards the external surface.

The space defined between the two surfaces (2, 3) forms a first cushioning chamber (5) for cushioning a weight that is resting upon one of the surfaces.

As can be seen in this embodiment, the internal and external surfaces (2, 3) are curved surfaces and connected at their ends forming a tubular body the section of which is in a horseshoe shape, forming two side lobes (8, 9) defining therebetween a space (10) suitable for receiving part of a patient's leg supported on the internal surface (2). This internal surface (2) preferably has in the external portion thereof a soft material suitable for contact with the patient's skin.

The horseshoe-shaped design allows the patient to turn over almost 360 degrees, without supporting him/herself on his/her heel, and furthermore allows mobilisation of the ankle and the patient as a whole without having to remove same, which is something of great interest for both professionals and family members.

This configuration is suitable for using the device for heels, ankles, and the area corresponding to the head of the fibula, for example. In other embodiments, the device can be designed with other shapes for use with other body parts such as, for example, the sides of the head or shoulder blades.

The device (1) further comprises an intermediate surface (6) located between the internal and external surfaces (2, 3), such that a second cushioning chamber (7) is defined between the intermediate surface (6) and the internal surface (2). The device also has ribs (4) made from an elastic material located in said second cushioning chamber (7) attached to the intermediate surface (6) and the internal surface (2), likewise with a radial orientation.

As can be better seen in FIG. 1, the ribs (4) are walls with a winding profile.

There is a lower density of ribs (4) per unit volume in the second cushioning chamber (7) than in the first cushioning chamber (5), such that the second cushioning chamber has a higher degree of deformation than the first chamber, providing the foot with: balance, stability, and sub-cushioning. Therefore, the first cushioning chamber (5) offers greater deformation resistance than the first chamber, since the radius are closer together (there is a higher density of ribs), providing the necessary rigidity and stability to the device since, with weight, it is flattened on the surface on which it is supported.

The second cushioning chamber (7) has an initial height comprised between 90 and 120 mm and the internal surface (2) with a radius of curvature comprised between 50 and 70 mm and a thickness of 2-4 mm, and has the function of reducing the pressure as much as possible. The area for supporting the patient's foot with this internal surface (2) has a curvature that slightly cushions the pressure exerted on the foot, cushioning from the first part of the system.

The first cushioning chamber (5), which is located after and outwardly with respect to the second chamber, and has a larger radius of curvature and the same thickness as before, will be the one in contact with the stretcher or other support surface, and is in charge of distributing the pressures transmitted from the second cushioning area to this first area as uniformly as possible, passing part of the radial pressure to the axial direction.

To obtain a flexural modulus between 22 MPa and 156.5 Mpa, consulted in the technical data sheet of the elastomer used, the system with semicircular ribs (4) made from an elastomer material is used for pressure distribution. Furthermore, this shape reduces the material needed for cushioning considerably, achieving manufacturing cost reduction and a lower assembly weight.

Figure 3:
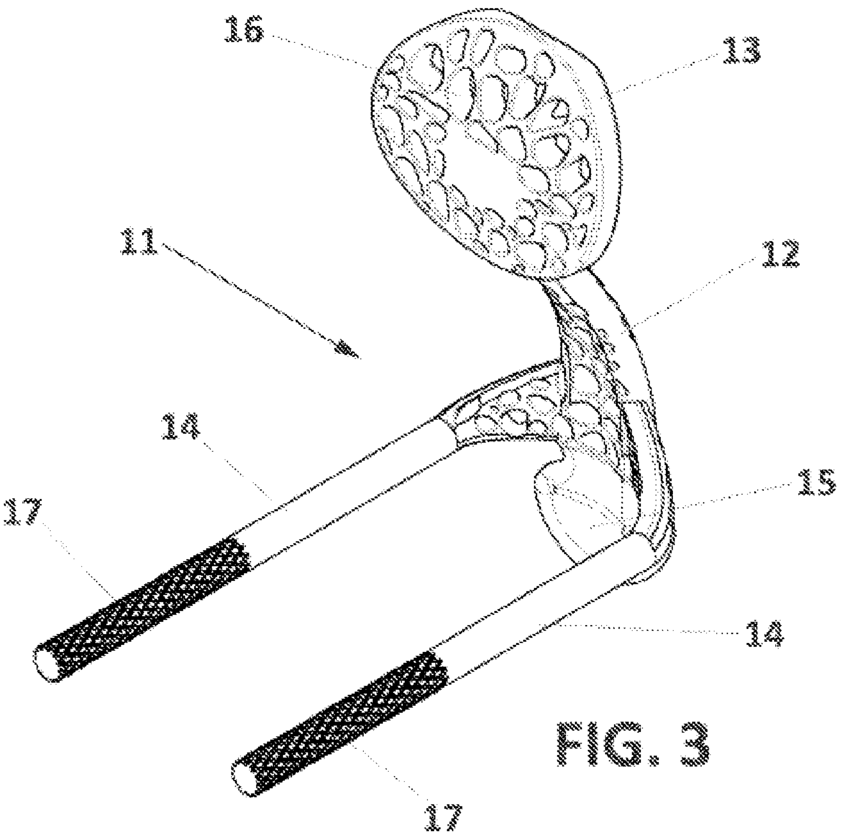
FIG. 3 shows a perspective view of the accessory of the device.
Figure 4:
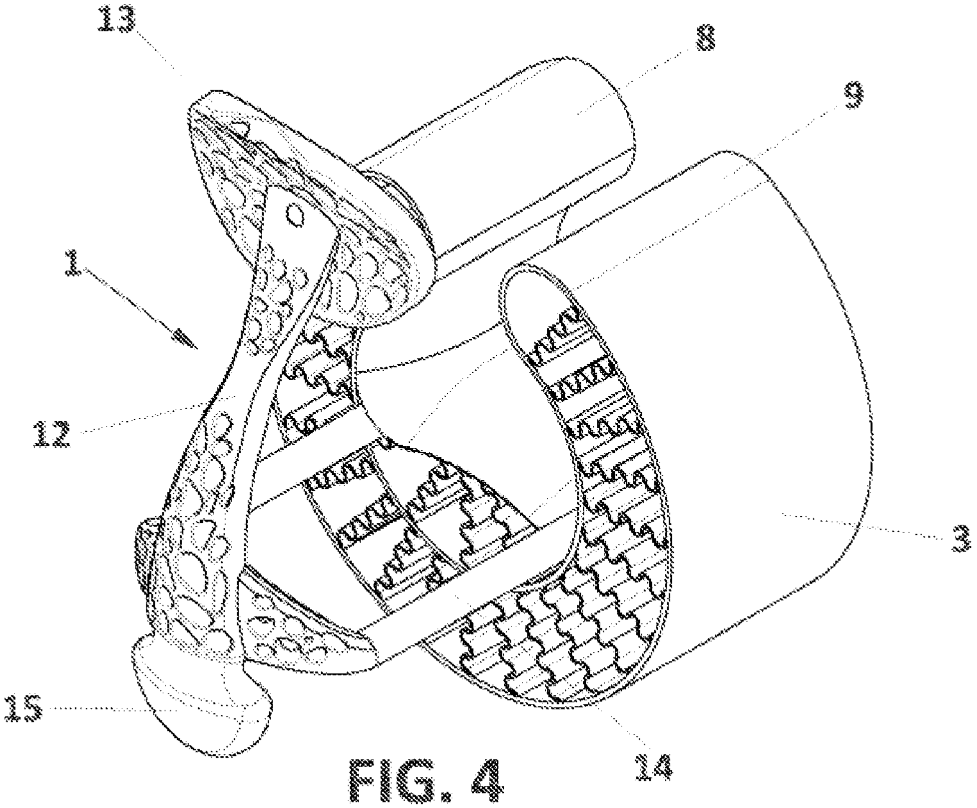
FIG. 4 shows a perspective view of the accessory and the device coupled to one another.
Figure 5:
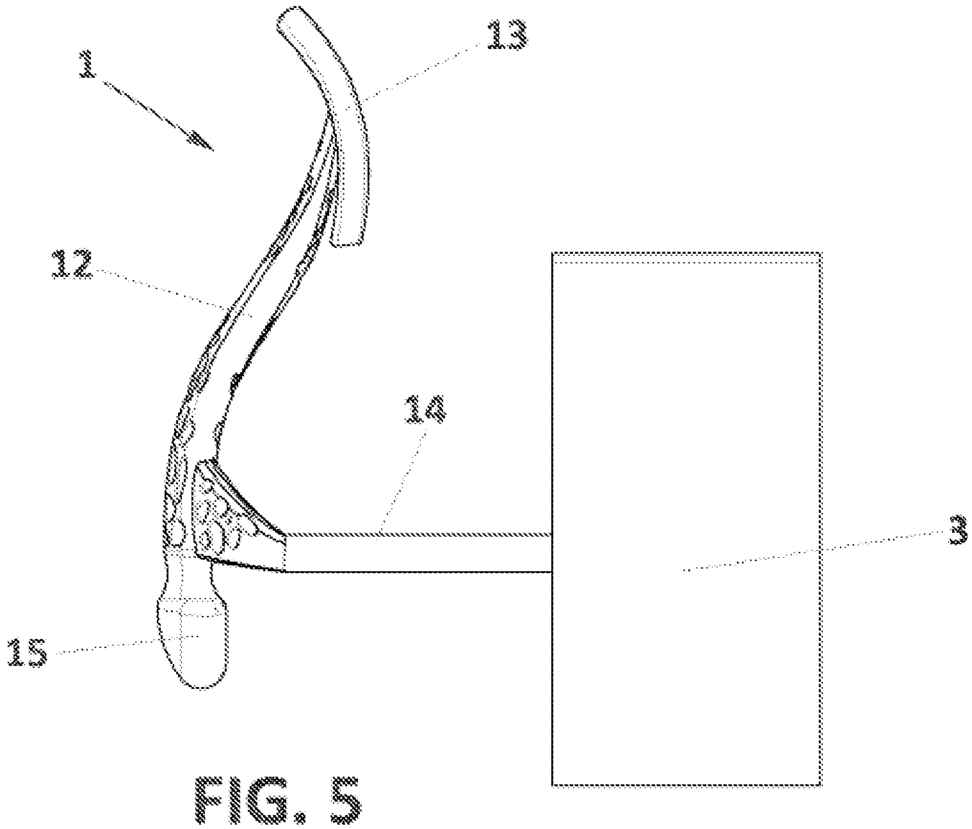
FIG. 5 shows a side elevational view of the assembly of FIG. 4.
Figure 6:
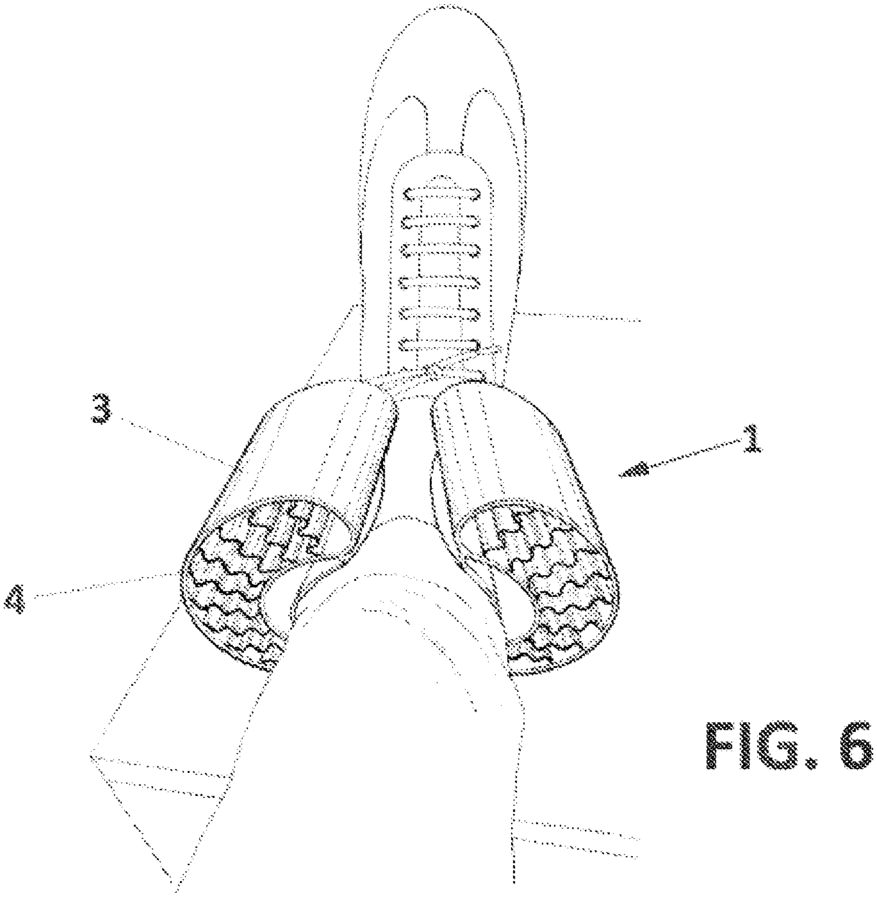
FIG. 6 shows a perspective view of the device in use by a patient.

As shown in FIGS. 3 to 5, the anti-bedsore device (1) further comprises a pedal-like accessory (11) which can be coupled between the ribs (4) and configured such that when the ankle area of a patient is resting upon the internal surface (2), the sole of the foot rests upon the accessory (11).

The main functionality of this accessory (11) is to prevent the problem known as club foot, a deformity of the human foot that remains permanently in a position of plantar flexion caused on many occasions by the weight of the foot itself after a long time of being bedridden.

The accessory has a series of holes (16) along the entire shape thereof which facilitate the entry and exit of air, favouring the ventilation thereof, just like the main body formed by the surfaces (2, 3). This will help to prevent the patient from sweating, unpleasant odours, and a possible slippage of the foot. Furthermore, these holes (16) will reduce the cost of the accessory due to the reduction of material, in turn making it much more lightweight.

The accessory (11) has a neck (12), a pedal (13) per se assembled at the upper end of the neck (12), and two bars (14) emerging from the lower portion of the neck (12) and insertable between the ribs (4) of the device, as shown in FIGS. 4 and 5.

Preferably, the end portion of the bars (14) which is intended to be introduced between the ribs (4) has a knurling (17) for the purpose of increasing friction between both parts and reducing slippage in the assembly. This is carried out for the purpose of preventing the movement of both due to the pressure of the sole of the foot on the accessory, which can cause a variation in the angle of the foot as a result of the increased length.

The pedal (13) is a curved pedal and has an oval shape so as to provide better adaptation to the sole of the foot and greater ergonomics.

As can be seen in FIG. 5, the accessory (11) is sized such that when it is coupled to the rest of the device, the lower portion (15) of the accessory (11) is at a higher level than the lower area of the external surface, with respect to the support surface of the device.

This feature of the accessory (11) being located at a greater height than that of the deformable body formed by the surfaces (2, 3) serves to compensate for the lowering of the deformable body with the application of force due to weight, preventing the generation of a non-uniform pressure on the patient's foot. Therefore, the ideal practice would be for the patient's leg to be parallel to the surface of the stretcher.

The lower portion (15) or foot of the accessory (11), at the end opposite that which the pedal (13) is attached, has a rounded shape that favours accompanying both the left and right turning of the main element to favour patient comfort. Furthermore, this lower portion (15) prevents a possible forward movement of the device after applying the force of the sole of the foot on the fastening oval.

The invention claimed is:

1. An anti-bedsore device comprising: an internal surface, an external surface, and a first plurality of ribs made from an elastic material, attached to the internal surface and to the external surface, and located within a space defined between both internal and external surfaces, and oriented radially with respect to a central point, such that the space defined between the two surfaces forms a first cushioning chamber for cushioning a weight that is resting upon one of the internal and external surfaces, and an intermediate surface located between the internal and external surfaces, such that a second primary cushioning chamber is defined between the intermediate surface and the internal surface, wherein the second primary cushioning chamber includes a second plurality of ribs made from an elastic material located therein, the second plurality of ribs attached to the intermediate surface and the internal surface and oriented radially.

2. The anti-bedsore device according to claim 1, wherein the first plurality of ribs are oriented in a manner diverging from the internal surface towards the external surface.

3. The anti-bedsore device according to claim 1, wherein the internal and external surfaces are curved surfaces.

4. The anti-bedsore device according to claim 1, the internal and external surfaces are connected at ends forming a tubular body a section of which is in a horseshoe shape.

5. The anti-bedsore device according to claim 4, wherein a space suitable for receiving part of a leg of a patient supported on the internal surface is defined between side lobes of the tubular body and the internal surface.

6. The anti-bedsore device according to claim 1, wherein the first plurality of ribs are walls with a winding profile.

7. The anti-bedsore device according to claim 1, wherein there is a higher density of ribs per unit volume in the first cushioning chamber than in the second primary cushioning chamber, such that a degree of deformation of the second primary cushioning chamber is greater than that of the first cushioning chamber.

8. The anti-bedsore device according to claim 1, wherein the internal, external, and intermediate surfaces are made from an elastic material.

9. The anti-bedsore device according to claim 1, further comprising a pedal-like accessory, which is configured to be coupled between the first plurality of ribs, and configured such that when an ankle area of a patient is resting upon the internal surface, a sole of a foot of the patient rests upon the pedal-like accessory.

10. The anti-bedsore device according to claim 9, wherein the pedal-like accessory has a neck, a pedal assembled at an upper end of the neck, and two bars emerging from a lower area of the neck and insertable between the first plurality of ribs of the anti-bedsore device.

11. The anti-bedsore device according to claim 10, wherein the pedal-like accessory is sized such that when the pedal-like accessory is coupled to the rest of the anti-bedsore device, a lower portion of the pedal-like accessory is at a higher level than a lower area of the external surface.

12. The anti-bedsore device according to claim 10, wherein the pedal-like accessory has holes to facilitate entry and exit of air.

* * * * *